(No Model.)

E. S. FRAZIER.
BICYCLE TIRE.

No. 529,120. Patented Nov. 13, 1894.

Witnesses

Inventor
Edward S. Frazier
by his Attys

UNITED STATES PATENT OFFICE.

EDWARD S. FRAZIER, OF AURORA, ILLINOIS.

BICYCLE-TIRE.

SPECIFICATION forming part of Letters Patent No. 529,120, dated November 13, 1894.

Application filed February 24, 1894. Serial No. 501,444. (No model.)

*To all whom it may concern:*

Be it known that I, EDWARD S. FRAZIER, a citizen of the United States, residing at Aurora, in the county of Kane and State of Illinois, have invented certain new and useful Improvements in Bicycle-Tires, of which the following is a specification, reference being had to the accompanying drawings, in which—

Figure 1:
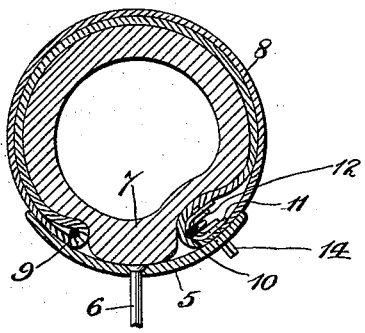
Figure 2:
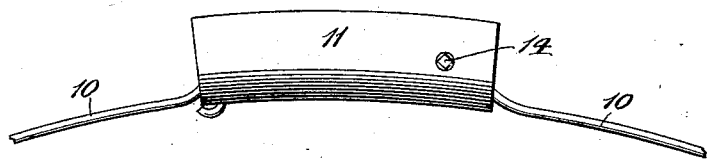
Figure 3:
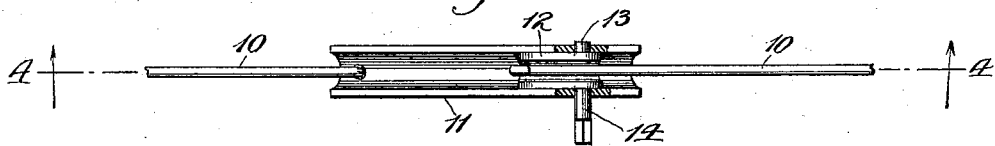
Figure 4:
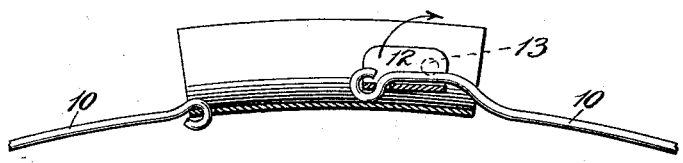

Figure 1 is an enlarged detail, being a vertical cross section of the tire showing my improvements. Fig. 2 is a side view of a part of the device for locking the tire upon the wheel rim. Fig. 3 is a plan view of the same, part being in section. Fig. 4 is a section on line 4—4 of Fig. 3.

My invention relates to bicycle tires, and has particularly to do with devices for securing pneumatic tires in place upon the wheel rim. As is well known, the ordinary pneumatic bicycle tire consists in general of an interior pneumatic tube and an exterior covering therefor, which covering serves not only to protect the interior of the tube, but also to secure the tire in place upon the wheel rim. My invention has for its object to provide new and improved devices for securing the tire upon the wheel rim, which devices will be so constructed as to permit of the tire being readily removed when desired.

I accomplish the object of my invention as hereinafter specified and as illustrated in the drawings.

That which I claim as new will be set forth in the claims.

In the drawings—5 indicates the wheel rim, and a portion of one of the spokes.

7 indicates the interior pneumatic tube.

8 indicates the exterior covering, which, as shown in Fig. 1, is double, its ends lying between the pneumatic tube and the wheel rim. The covering 8 is held in place by means of wires 9—10, one in each doubled end of said covering, as shown in Fig. 1. The length of the wires 9—10 is such that when they are tightened, as will be hereinafter described, the diameter of the ring formed by the wire will be less than the diameter of the outer edges of the wheel rim. The wires will therefore be prevented from slipping off the wheel rim. The pneumatic tube 7 when inflated exerts sufficient internal pressure upon said wires to prevent them from moving inwardly. As the wires 9—10 are alike in all essential particulars, it will be necessary to describe the method of tightening only one of them.

11 indicates a semi-cylindrical or U-shaped plate, which is adapted to lie within the doubled end of the covering 8, as shown in Fig. 1, to one end of which plate is secured one end of the wire 10.

12 indicates a smaller semi-cylindrical or U-shaped plate or lever, which is adapted to fit into the plate 11, and is pivoted thereto by pivots 13—14, as shown in Fig. 3. The pivots 13—14 are located near one end of the inner plate 12, the arrangement being such that said plate 12 may be partially rotated so as to bring either side uppermost. The other end of the wire 10 is connected to the end of the inner plate 12 which is farther from the pivots 13—14, so that by partially rotating the plate 12 in one direction or the other the wire 10 may be tightened or loosened as the case may be. One end of the pivot 14 is elongated sufficiently to project through the wheel rim, and has its end squared in order to provide for its being turned by a key.

When the tire is secured upon the wheel rim, the ends of the wire are in the position shown in Fig. 4. When the tire is to be removed the plate 12 is turned over upon its pivot, moving in the direction indicated by the arrow in Fig. 4, and consequently slackening the wire 10 sufficiently to permit of its being slipped over the edge of the wheel rim. The extent to which the wire is loosened may, of course, be varied, depending upon the shape of the wheel rim; and in cases where the wheel rim is concave, as shown in Fig. 1, the slackening will be very slight, as by deflating the tire the wire at one side of the wheel may be slipped down to the center of the wheel rim, thereby permitting the wire at the opposite side of the wheel to be slipped over the edge of the rim; but if desired the wire may be so slackened that it may be slipped over the edge of the rim without deflating the tire to any considerable extent.

I do not wish to limit myself to making the plates 11—12 of the specific shape shown, as various modifications may be made without departing from my invention.

Instead of wire, any other suitable material may be used.

That which I claim as my invention, and desire to secure by Letters Patent, is—

1. The combination with a wheel-rim, a tire, and a tire-retaining wire, of a U-shaped plate 11 arranged within a part of the tire and connected with one end of the wire, a swinging U-shaped plate 12 connected with the other end of the wire, and an axially rotatable pivot-pin connected with the said swinging-plate and projecting through the wheel-rim, substantially as and for the purposes described.

2. The combination with a wheel-rim, a tire, and a tire-retaining wire, of a U-shaped or channeled plate 11 arranged within a part of the tire and connected with one end of the wire, an axially rotatable pivot 13 journaled in the said plate and having one end extending through the wheel-rim and provided with means for the application of a key for turning the pivot, and a U-shaped plate 12 secured to the pivot-pin between the sides of the plate 11, and connected with the wire, substantially as and for the purposes described.

EDWARD S. FRAZIER.

Witnesses:
WALTER S. FRAZIER, Jr.,
GEORGE W. WILSON.